(No Model.)

L. G. HARPER.
SPOKE SOCKET.

No. 459,286. Patented Sept. 8, 1891.

Witnesses.
Robert Everett.
Dennis Sumby.

Inventor.
Lewis G. Harper.
By
James L. Norris.
Atty.

THE NORRIS PETERS CO., PHOTO-LITHO., WASHINGTON, D. C.

UNITED STATES PATENT OFFICE.

LEWIS G. HARPER, OF WEST CHESTER, PENNSYLVANIA.

SPOKE-SOCKET.

SPECIFICATION forming part of Letters Patent No. 459,286, dated September 8, 1891.

Application filed January 29, 1891. Serial No. 379,569. (No model.)

*To all whom it may concern:*

Be it known that I, LEWIS G. HARPER, a citizen of the United States, residing at West Chester, in the county of Chester and State of Pennsylvania, have invented new and useful Improvements in Spoke-Sockets, of which the following is a specification.

My invention relates to certain improvements in spoke-sockets; and the purpose thereof is to provide a simple and novel construction whereby the objectionable method of tightening the wheel upon the spokes by shrinking the tire upon the felly or rim may be wholly avoided, and whereby the spokes may be independently tightened should one or more become loose from any cause.

The invention consists in the several novel features of construction and new combinations of parts hereinafter fully set forth, and then definitely pointed out in the claims which follow this specification.

To enable others to understand and practice my said invention, I will proceed to describe the same in detail, reference being had to the accompanying drawings, in which—

Figure 1:
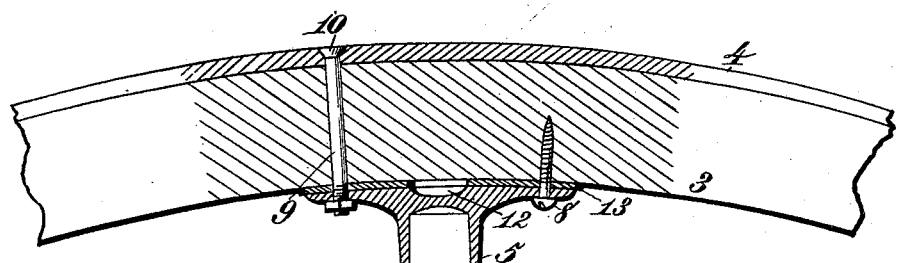
Figure 3:
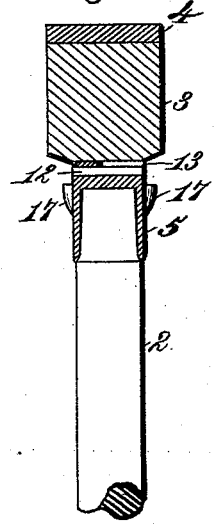
Figure 2:
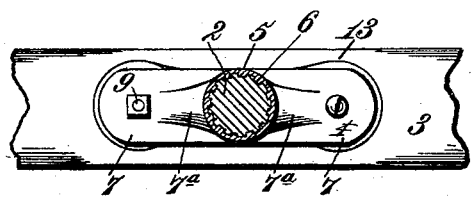
Figure 4:
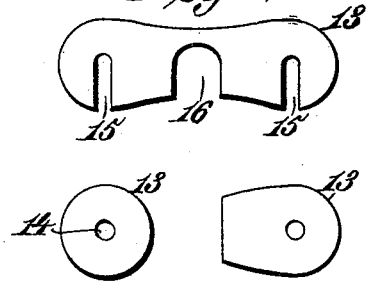
Figure 5:
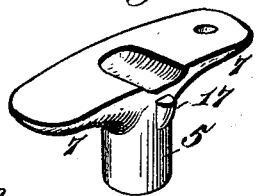
Figure 6:
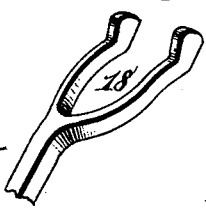

Figure 1 is a section taken in the central line of the rim or felly and along the axis of the spoke, showing my invention. Fig. 2 is a transverse section of the spoke-socket and spoke, the inner surface of the rim or felly being shown in elevation. Fig. 3 is a transverse section of the rim or felly, the line of section passing through the spoke-socket longitudinally. Fig. 4 is a view of two forms of cushion or washer used in tightening the spokes. Fig. 5 is a detail view showing a modified construction. Fig 6 is a detail view showing a lever used with a modified construction of the socket.

In the said drawings, the reference-numeral 2 designates the spoke of the wheel, which, together with the hub, is of any known or preferred construction.

The reference-numeral 3 indicates the rim or felly having a metal tire 4.

Upon the outer end of the spoke 2 is mounted a metallic spoke-socket 5, the inner surface thereof being provided with a series of ribs 6, arranged longitudinally or parallel with the axis of the socket and projecting inward, whereby they become more or less deeply buried in the wood of the spoke-tenon when the latter is inserted. Upon the socket-piece at its closed end or head are formed oppositely-projecting lugs 7, strengthened by flanges $7^a$, which rest against the inner convex face of the rim or felly 3. In one of these lugs is formed an opening to receive a rim-bolt 8, which is fastened in place when the wheel is made, the other lug being bored when the tire is applied to receive a tire-bolt 9. The rim-bolt passes into but not through the wood of the felly or rim; but the tire-bolt extends through both rim and tire, being provided with a suitable head 10, which rests in a countersunk seat in the tire.

In the central portion of the closed end or head of the metallic socket-piece between the lugs 7 is formed a concave recess 12, transverse to the rim or felly and extending either wholly or partly across the closed end of the socket-piece, whereby access thereto may be obtained upon both sides of the felly or upon one side only, as preferred. The purpose of this construction is to permit the introduction of a lever or wedge, whereby the spoke-socket may be separated from the rim when the wheel becomes "rim-bound" or "spoke-loose" for the introduction of a "shim," cushion, or washer 13, formed preferably of metal, though it may also be made of leather, fiber, or any other suitable material. These cushions or washers may be of any suitable form; but I have shown in Fig. 4 two different constructions, both of which I have used with good results. In one the shim or cushion is substantially circular or D-shaped, as shown in Fig. 4, and is provided with a central aperture 14 to receive the tire-bolt 9, which must be lifted or driven out sufficiently to enable its end to enter the aperture. In the other form the shim or cushion is double, whereby it is adapted to extend over both the lugs of the socket-piece and the felly or rim, and instead of apertures to receive the bolts 8 and 9 I form slots 15 cut from one edge substantially to the centers of the rounded end portions of the double cushion, thus enabling it to be inserted without removing or displacing either bolt for that purpose. A central slot 16 is also cut part way across the cushion to permit the introduction of a lever or wedge. With this construction the recess 12 may be formed of half-length—that is to say, it may extend from the side of the socket piece to the central line thereof, the lever being inserted upon one side only. When the recess 12 is formed entirely across the head of the socket-piece, separating devices may be used of the kind known as "nipper-wedges," consisting of tapered points mounted on the ends of lever-arms, which are pivotally connected like the handles of a punch. When the wheels become rim-bound or spoke-loose, a lever or wedge is inserted in the lever-opening, the rim or felly is forced outward or the spoke driven inward, as the case may be, and the shims or cushions are inserted in the manner described, restoring the wheel to as good condition as when it was new, and requiring very little time or labor and practically no expense to accomplish such result. The interior ribs of the socket prevent the spoke-tenon from becoming crushed when inserted and swelled by wet, whereby it becomes loose upon drying. In forming these ribs, if they are used, it will probably be found desirable to limit them to that portion of the socket next the rim or felly, extending thence part way to the mouth of the socket. I may form at opposite points upon the opposite outer faces of the socket the lugs or projections 17, forming a lever-hold upon which the prongs of the forked lever 18 may rest, the points thereof bearing against the inner surface of the felly, whereby a downward pull will separate the rim and the head of the socket and permit the insertion of a washer or shim.

It should be noted that it is not material to my invention that either of the bolts fastening the spoke-socket should extend through the tire. Both may pass into the rim or felly only, or either one may extend through the tire.

What I claim as my invention is—

1. The combination, with a wheel-spoke and a rim or felly, of a metallic spoke-socket receiving the tenon upon the end of the spoke and attached to the rim, a recess transverse to said rim being formed in the head or closed end of the socket-piece, substantially as described.

2. The combination, with a wheel-spoke and a rim or felly of a metallic spoke-socket having lugs which receive the fastening-bolts and provided with a recess formed in the closed end or head of the socket-piece between said lugs and adjacent to the inner face of the rim, said recess extending from side to side of the socket-piece, substantially as described.

3. In a wheel, the combination, with the spoke and rim or felly, of a spoke-socket having longitudinal ribs upon its inner face which engage the inserted tenon of the spoke and having lugs adapted to rest against the rim, one receiving a rim-bolt and the other a tire-bolt, the closed end or head of the socket-piece being provided with a transverse recess adapted to receive the end of a lever or wedge, substantially as described.

4. The combination, with a wheel-spoke, of a metallic spoke-socket formed in a single piece, with its socket 5 closed at its outer end, and with lateral lugs 7, which are rigidly attached to the under side of the wheel-rim, and having a lever-hold to provide engagement for a lever by which the socket and its lugs may be separated from the wheel-rim for the insertion of a washer, substantially as described.

In testimony whereof I have hereunto set my hand and affixed my seal in presence of two subscribing witnesses.

LEWIS G. HARPER. [L. S.]

Witnesses:
 S. D. RAMSEY,
 WM. P. MARSHALL.